UNITED STATES PATENT OFFICE.

CHARLES R. ENGEL, OF MONTPELLIER, (HÉRAULT,) FRANCE, ASSIGNOR TO THE SOCIETY OF CARBONATE OF POTASH, OF SAME PLACE.

MANUFACTURE OF CARBONATE OF POTASSIUM.

SPECIFICATION forming part of Letters Patent No. 252,653, dated January 24, 1882.

Application filed November 21, 1881. (No specimens.) Patented in France December 30, 1880.

*To all whom it may concern:*

Be it known that I, CHARLES RODOLPHE ENGEL, chemist, a citizen of the Republic of France, and residing in Montpellier, (Hérault,) France, have invented Improvements in the Manufacture of Carbonate of Potassium, (for which I have obtained a French patent, December 30, 1880, No. 140,427,) of which the following is a specification.

My invention consists in an entirely new method of manufacturing carbonate of potash from any other soluble salt of potassium. It is based upon the discovery that if either magnesia or a carbonate of magnesium be added to an aqueous solution of a potassium salt, and the resulting mixture be then heated by carbonic-acid gas, there is found a double carbonate of magnesium and potassium, from which carbonate of potash may afterward be separated, as will hereinafter be set forth.

In describing how this invention is to be carried into effect I will suppose that the potassium salt from which carbonate of potash is to be manufactured is potassium chloride. In such case an aqueous solution of potassium chloride and carbonate of magnesium in a finely-divided state are charged into a suitable vessel furnished with a mechanical agitator, and the aperture by which these materials were admitted is then closed by a suitable cock or otherwise. The agitator is then set in motion, and there is then sent into the said vessel carbonic-acid gas, either at or above the atmospheric pressure. Absorption of carbonic acid takes place with formation, on the one hand, of small crystals of a double carbonate of magnesium and potassium, and on the other hand of chloride of magnesium. When carbonic acid ceases to be absorbed the reaction is terminated. The contents of the vessel in which the reaction has been performed are now drawn off by a suitable cock into another vessel, in which they are allowed to settle. The deposit consists of small crystals of the aforesaid double carbonate of magnesium and potassium mixed or not with any excess of carbonate of magnesium which may have been used, while the supernatant liquor is chiefly a solution of chloride of magnesium with any excess of chloride of potassium which may have been employed. The supernatant liquor, however, contains also the elements of more double carbonate, which it is capable of depositing on longer standing. It is therefore drawn off into still another vessel, in which it is allowed to remain until it has deposited as much further double carbonate as it will. It is found to do this more rapidly if either magnesia or oxycarbonate of magnesium be added to it with agitation. Both deposits are then separated as far as possible from the mother-liquor by means either of a centrifugal hydro-extractor or by a filter-press or other suitable appliance, as will be well understood. The double carbonate of potassium and magnesium is thus obtained practically free from mother-liquor and from all foreign solids, except, perhaps, magnesia or carbonate of magnesium, or both, and these are immaterial. It now remains to separate carbonate of potash from the said double carbonate, and this may be done in either of two ways. If the double carbonate be boiled with water, it splits up into carbonic acid, carbonate of magnesium, and carbonate of potash. The carbonic acid goes off as gas, and can be used for the production of more double carbonate. There remains a solution of carbonate of potash holding in suspension carbonate of magnesium. This solution can be readily separated from the suspended carbonate of magnesium by filtration, and from the filtered solution commercial carbonate of potash can then be obtained either by evaporation to dryness, or by partial evaporation followed by cooling and crystallization, as will be well understood. Or the double carbonate may be decomposed by heating it in the dry way, and the product be treated by water, and the resulting solution of carbonate of potash be then filtered from carbonate of magnesium, and thereafter be dealt with as already described. In either case the carbonate of magnesium filtered from the solution of carbonate of potash should be used for the production of more double carbonate. It is to be observed, however, that the quantity of carbonate of magnesium thus separated by filtration from the solution of carbonate of potash will not be so great as the quantity which was originally added to the solution of chloride of potassium commenced with, since a portion of the carbonate of magnesium commenced with has been converted into chloride of magnesium. If the mother-liquor containing this chloride of magnesium be concentrated by evaporation, and be then further evaporated to dryness, and the residue calcined in presence of vapor of water, the chloride of magnesium will be decomposed into hydrochloric acid, which can be condensed in the usual way, and magnesia, which should be added, together with the carbonate of magnesium filtered from the solution of carbonate of potash, to the solution of chloride of potassium used in the next operation. If this be done each time, the quantity of carbonate of magnesium commenced with will serve indefinitely, except to the extent of any small mechanical loss. If this be not done, a quantity of fresh carbonate of magnesium must be employed in each successive operation equivalent to the quantity of carbonate of potash obtained from the preceding operation; or, instead of adding the carbonate of magnesium in the first operation, one may add free magnesia, since what takes place in that operation when free magnesia is present at the commencement of it is simply the conversion of that free magnesia into magnesium carbonate.

The double carbonate produced as above described will usually consist of one equivalent—or, say, eighty-four parts, by weight—of normal carbonate of magnesium, (or $MgCO_3$,) combined with one equivalent—or, say, one hundred parts, by weight—of bicarbonate of potassium, (or $HKCO_3$;) but it may also under some circumstances consist of one equivalent—or, say, eighty-four parts, by weight—of normal carbonate of magnesium, (or $MgCO_3$,) combined with one equivalent—or, say, one hundred and thirty-eight parts, by weight—of monocarbonate of potassium, (or $K_2CO_3$;) or its constitution may be intermediate between these two extremes. The maximum and most usual quantity of carbonate of magnesium, or of free magnesia, to be employed in the first operation above described is thus the quantity containing one equivalent—or, say, twenty-four parts, by weight—of metallic magnesium per one equivalent—or, say, thirty-nine parts, by weight—of metallic potassium contained in the double carbonate produced. In some cases less than this proportion would suffice; but the employment of a larger quantity of carbonate of magnesium, or of magnesia, than the quantity contained in the double carbonate produced will not be attended by any serious disadvantage.

From this description of the manner in which the present invention may be performed when it is applied to the manufacture of carbonate of potash from chloride of potassium, the manner of performing it when it is applied to the manufacture of carbonate of potash from other salts of potassium will be fully understood. All the operations are the same whatever salt of potassium be commenced with, except as regards the treatment of the mother-liquor, from the first operation. When, for example, the salt commenced with is sulphate of potassium, the mother liquor will contain sulphate of magnesium, which cannot be utilized in the same manner as chloride of magnesium, but can be utilized in other ways, as will be well understood by practical men.

It should be added that this invention can be applied to double salts of potassium and magnesium, such as carnalite.

What I claim as my invention, and desire to secure by Letters Patent of the United States, is—

1. The method of producing carbonate of potassium from other salt of potassium by forming a double carbonate of potassium and magnesium in the manner explained and separating the carbonate of potassium from said double carbonate by boiling or by heating in a dry state, substantially as described.

2. The method of obtaining a double carbonate of magnesium and potassium by treating by carbonic-acid gas a mixture of carbonate of magnesium, or free magnesia, with an aqueous solution of a salt of potassium, substantially as hereinbefore described.

In testimony whereof I have signed my name to this specification in the presence of two subscribing witnesses.

CHARLES RODOLPHE ENGEL.

Witnesses:
EU. ISENBERG,
CASTELOIZ.